Figure 1:
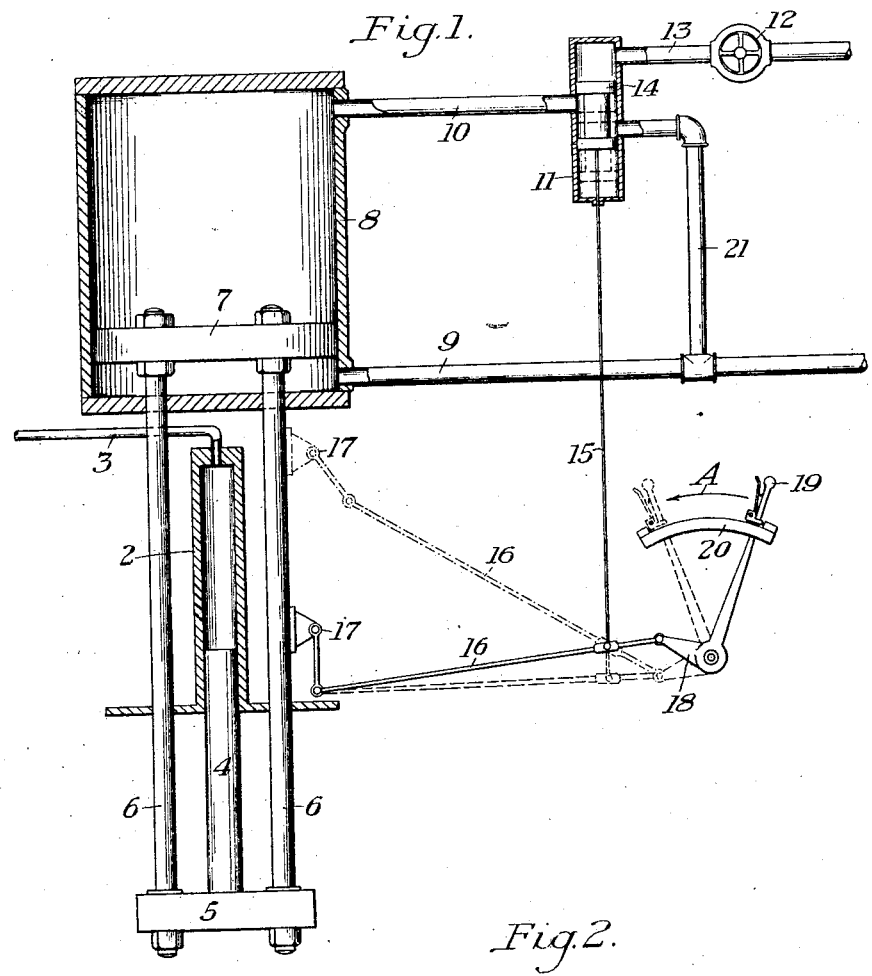

Oct. 6, 1925.

L. JOHNSON

VALVE GEAR FOR INTENSIFIER CYLINDERS

Filed Dec. 31, 1924

INVENTOR

Patented Oct. 6, 1925.

1,556,221

UNITED STATES PATENT OFFICE.

LANE JOHNSON, OF INGRAM, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

VALVE GEAR FOR INTENSIFIER CYLINDERS.

Application filed December 31, 1924. Serial No. 759,057.

*To all whom it may concern:*

Be it known that I, LANE JOHNSON, a citizen of the United States, residing at Ingram, in the county of Allegheny and State of Pennsylvania, have invented a new and useful Improvement in Valve Gears for Intensifier Cylinders, of which the following is a full, clear, and exact description.

The present invention relates broadly to intensifier cylinders utilized in connection with the operation of heavy duty machinery, such for example as hydraulic shears, and more particularly to an improved valve gear for use in connection therewith.

It has heretofore been customary in the art to which the present invention relates to provide intensifier cylinders containing a piston of relatively small cross sectional area operated by a second piston of much greater cross sectional area usually movable within a steam cylinder. The construction has been such that steam pressure has been utilized for moving this larger piston in one direction to produce the intensified pressure by means of the smaller piston. Upon completion of the work for which the high pressure was required, however, there has heretofore been no effective means provided for preventing sudden jumping of the larger piston under the influence of its steam pressure and in the absence of a restraining load. Usually a partial checking has been obtained only by reason of the leakage of some of the steam pressure around the piston and the subsequent trapping or partial trapping of this steam in one end of the cylinder.

Such a construction is objectionable not only for the reasons pointed out but for the further reason that normally no steam pressure is maintained within the steam cylinder, this making it necessary to start from a condition of atmospheric pressure, or substantially 15 pounds absolute pressure, and with a cold cylinder. The objections to this method of operating are readily apparent. It is one of the objects of the present invention to reverse this condition and provide means whereby the steam cylinder may be maintained at a high temperature at all times and may be initially operated at a pressure substantially equal to the steam pressure.

In the accompanying drawings I have illustrated diagrammatically one embodiment of the present invention, it being understood that the drawings do not define the limits of my invention and that changes in the construction and operation therein disclosed may be made without departing either from the spirit of the invention or the scope of my broader claims.

Figure 2:
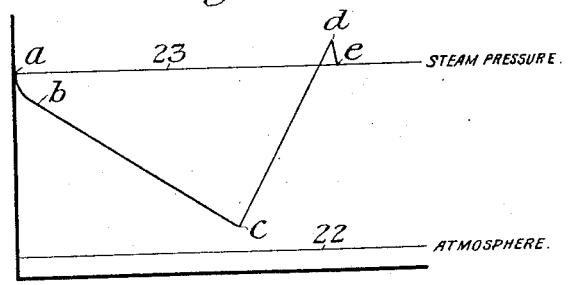

In the drawings:

Figure 1 is a diagrammatic view illustrating one arrangement of intesifier cylinder and valve gear therefor, and Figure 2 is a diagrammatic view illustrating graphically the pressure conditions existing within the steam cylinder.

In carrying out the present invention there may be provided an intensifier cylinder 2 having an outlet connection 3 leading to the cylinder of any apparatus which it may be desired to operate, as for example, hydraulic shears. Movable within the cylinder 2 is a piston 4 of comparatively small cross sectional area, and carried by a crosshead 5. This crosshead is connected by bolts or rods 6 to a piston 7 of comparatively large cross sectional area movable within a steam cylinder 8. The steam cylinder has a steam connection 9 at one end thereof directly connected to a source of steam supply and a second connection 10 with the opposite end leading to a control valve casing 11.

With the construction described, it will be apparent that when steam is admitted through the connection 9, and permitted to exhaust through the connection 10, the piston 7 will tend to move upwardly thereby actuating the intensifier piston 4 for obtaining the desired pressure for operating the machinery with which the intensifier cylinder is used. If this machinery comprises hydraulic shears, it will be apparent that upon completion of the shearing operation the load will be relieved from the intensifier piston 4 thereby freeing the steam piston 7 of its load. This has a tendency to cause the piston to rapidly accelerate, and reach the limit of its stroke with such speed and force as to substantially demolish the entire apparatus.

In accordance with the present invention such an operation of the steam cylinder is prevented by controlling the rapidity with which fluid pressure can escape from the steam cylinder, this control being effected by a choke valve 12 located within an exhaust connection 13 leading from the valve casing 11. Within the valve casing is a valve 14 connected by a link 15 to a second link 16. The link 16 at one end has a pivotal connection 17 with one of the rods 6 and at its opposite end has a pivotal connection with one arm 18 of a bell crank lever. The other arm of the bell crank lever may comprise a control handle 19 cooperating with a control segment 20 as is customary with controls of this general character. In Figure 1 the parts of the apparatus are illustrated in their normal position between successive working strokes. At this time, the valve 14 is in such position that steam pressure from the connection 9 may be supplied to the upper end of the cylinder 8 through the branch 21, the valve casing 11 and the connection 10. At the same time steam pressure will be supplied through the connection 9 to the lower end of the cylinder 8. Due, however, to the greater area of the upper surface of the piston 7 exposed to steam pressure, and to the weight of the piston 8 and its associated parts, this pressure will be effective for maintaining the piston 7 in its lower position. This maintains a steam pressure at all times in opposite ends of the steam cylinder thereby keeping it up to working temperature at all times. This constitutes one important feature of the present invention, as it overcomes objectionable steam condensation within the cylinder such as occurs when it is permitted to cool between successive strokes.

When it is desired to operate the intensifier cylinder, the control handle 19 is moved in the direction of the arrow A. This moves the valve 14 to the dotted position of Figure 1 thereby cutting off communication between the branch 21 and the connection 10, and placing the connection 10 in communication with the exhaust 13 through the valve casing. This permits the steam pressure from above the piston 7 to drop at a speed determined by the position of the choke valve 12. At the same time, the pressure below the piston will tend to move the same upwardly. The pressure above the piston continues to drop as the piston moves upwardly until such time as the work being performed by the pressure created within the intensifier cylinder is completed. At this time, the piston 7 tends to accelerate thereby moving more rapidly, proportionately, than steam is allowed to escape from above the piston. This tends to create a condition in which the pressure above the piston becomes equal to or exceeds the operating steam pressure for an instant, thus serving to effectively check the movement of the piston without damage to the apparatus. At the time the movement of the piston is checked, the valve 14 will have been moved to substantially its full line position of Figure 1 in which position the connection 10 receives steam directly from the branch 21 so that steam pressure is reestablished on opposite sides of the piston 7, this condition being effective as before pointed out for causing the piston 7 to return to its normal position.

In Figure 2 I have illustrated this condition graphically. The line 22 represents atmospheric pressure and the line 23 steam pressure. At the outset, with the piston 7 in a position shown in Figure 1, the pressure in opposite ends of the cylinder is equal to the maximum steam pressure, this condition being indicated by the point $a$, it being understood that throughout the description of the diagram ordinates generally indicate pressure and the abscissæ indicate points in the travel of the piston. Upon the initial operation of the valve 14 the pressure above the piston will drop as indicated by the portion of the curve from $a$ to $b$. Thereafter as the piston travels, the pressure above the piston will gradually decrease as indicated by the portion of the curve from the lines $b$ to $c$. This portion of the curve can be varied at will depending upon the setting of the choke valve 12 to thereby control the speed of pressure release, it being possible if desired to maintain this portion of the curve substantially straight. At the completion of the work to be accomplished, as for example the shearing, which is indicated diagrammatically by the point $c$, the piston 7 will accelerate thereby increasing the pressure thereabove rapidly to provide an effective checking thereof, this condition being represented by the portion of the curve $cd$. At the time the piston nearly reaches the end of its stroke, the valve 14 will have been moved to establish communication between the connections 10 and 21 thereby causing the steam pressure to drop to the line 22 as indicated by the portion $de$ of the curve.

It will be understood that throughout the specification the expressions "upper" and "lower" are merely relative terms, it being possible that the cylinders may be arranged either in a vertical position or in a horizontal position as desired. The vertical position, however, is preferred as in this manner the weight of the piston 7 and its associated parts are effective for tending to return the parts to normal position.

The advantages of the present invention arise from the provision of controlling apparatus and method of control whereby there is obtained not only an efficient choking of the steam cylinder but also an operating condition preventing condensation by maintaining desirable temperature conditions at all times within the steam cylinders.

Further advantages arise from the provision of an apparatus in which steam pressure is maintained above the steam piston, thereby providing an initial positive pressure in the upper portion of a cylinder enabling a positive control of the speed of acceleration of this piston when its work has been completed.

I claim:

1. An intensifier, comprising an intensifier cylinder, an actuating cylinder therefor, and means for normally maintaining steam pressure is opposite ends of said actuating cylinder, substantially as described.

2. An intensifier, comprising an intensifier cylinder, a steam piston for operating the same, said piston having a differential piston area, and means for normally maintaining steam pressure on both sides of said piston.

3. An intensifier, comprising an intensifier cylinder, a steam cylinder for operating the same, means normally maintaining steam pressure in opposite ends of said actuating cylinder, and means controlling the speed of escape of steam from the one end of said actuating cylinder, substantially as described.

4. An intensifier, comprising an intensifier cylinder, a steam cylinder for building up pressure therein, a piston in said steam cylinder, means for normally maintaining a steam pressure on opposite sides of said piston, and means for gradually reducing the effective pressure on one side of said piston during a portion of the piston stroke, said means being operable for building up a counter pressure on said piston during another portion of the piston stroke.

5. In an intensifier apparatus a steam cylinder having an actuating piston therein, a steam connection to each end of said cylinder, a valve controlling one of said connections, and operating means for said valve effective during the normal position of the piston for maintaining steam pressure on both sides thereof, substantially as described.

6. The method of operating actuating pistons for intensifiers, comprising normally maintaining steam pressure on both sides of the piston, and then gradually relieving the pressure on one side to permit piston movement, substantially as described.

7. To the method of operating actuating pistons for intensifiers, comprising normally maintaining steam pressure on both sides of the piston, then gradually relieving the pressure on one side to permit piston movement, and then reestablishing the original pressure condition on both sides of said piston, substantially as described.

8. The method of operating pistons and intensifiers comprising establishing a positive pressure condition on both sides of the piston, thereafter gradually relieving the pressure on one side and continuing such release until the completion of the work to be accomplished, and thereafter building up an opposing pressure on said piston, substantially as described.

9. The method of operating pistons and intensifiers comprising establishing a positive pressure condition on both sides of the piston, thereafter gradually relieving the pressure on one side and continuing such release until the completion of the work to be accomplished, thereafter building up an opposing pressure on said piston, and then reestablishing the original pressure conditions on both sides of said piston, substantially as described.

In testimony whereof I have hereunto set my hand.

LANE JOHNSON.